(12) United States Patent
Balasaygun et al.

(10) Patent No.: US 7,327,721 B2
(45) Date of Patent: Feb. 5, 2008

(54) DETERMINATION OF ENDPOINT VIRTUAL ADDRESS ASSIGNMENT IN AN INTERNET TELEPHONY SYSTEM

(75) Inventors: Mehmet Balasaygun, Ocean, NJ (US); Charles Bertsch, Howell, NJ (US); Anthony P. Frissora, Fair Haven, NJ (US); Robert Reagan Gilman, Broomfield, CO (US); Brijesh Mandan, Fords, NJ (US); Nancy Kathryn Schmidt, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1082 days.

(21) Appl. No.: 10/227,970

(22) Filed: Aug. 26, 2002

(65) Prior Publication Data

US 2003/0152068 A1    Aug. 14, 2003

Related U.S. Application Data

(60) Provisional application No. 60/355,896, filed on Feb. 11, 2002.

(51) Int. Cl.
*H04L 12/66* (2006.01)
(52) U.S. Cl. ...................... 370/352; 370/401
(58) Field of Classification Search ............... 370/392, 370/401, 352, 353
See application file for complete search history.

(56) References Cited

U.S. PATENT DOCUMENTS

| | | | |
|---|---|---|---|
| 6,731,642 B1 * | 5/2004 | Borella et al. | 370/401 |
| 6,876,633 B2 * | 4/2005 | Strathmeyer et al. | 370/260 |
| 2002/0152325 A1 * | 10/2002 | Elgebaly et al. | 709/246 |
| 2006/0018308 A1 * | 1/2006 | Choi et al. | 370/352 |
| 2006/0274733 A1 * | 12/2006 | Mussman et al. | 370/352 |

FOREIGN PATENT DOCUMENTS

| WO | WO 02073330 | * 9/2002 |
|---|---|---|
| WO | WO 02003217 | * 10/2002 |

* cited by examiner

*Primary Examiner*—Wing Chan
*Assistant Examiner*—Michael J. Moore
(74) *Attorney, Agent, or Firm*—Ryan, Mason & Lewis, LLP (57) ABSTRACT

Techniques for determination of endpoint Internet Protocol (IP) address assignment in an Internet telephony system are disclosed. In conjunction with the establishment of a voice path between an endpoint and a gatekeeper in the Internet telephony system, a virtual address assigned to the endpoint in a network address translation operation is determined. The virtual address is then communicated to the endpoint as part of or otherwise in conjunction with a registration process prior to establishment of the voice path such that the registration process can complete successfully despite the network address translation operation. Advantageously, the invention overcomes problems associated with voice path registration failures resulting from network address translation in a router, virtual private network (VPN) gateway or other similar network address translation device.

17 Claims, 12 Drawing Sheets

DETERMINATION OF ENDPOINT VIRTUAL ADDRESS ASSIGNMENT IN AN INTERNET TELEPHONY SYSTEM

RELATED APPLICATION(S)

The present application claims the priority of U.S. Provisional Patent Application Ser. No. 60/355,896 filed Feb. 11, 2002 and entitled "Determination of Endpoint IP Address Assignment in an Internet Telephony System."

FIELD OF THE INVENTION

The invention relates generally to voice-over-IP (VoIP) and other aspects of Internet telephony, and more particularly to address determination techniques for use in endpoint registration and other processes associated with Internet telephony.

BACKGROUND OF THE INVENTION

Internet telephony systems are typically implemented using VoIP techniques, such as those described in International Telecommunication Union-Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, both of which are incorporated by reference herein.

As is described in greater detail in the above-cited H.323 document, an Internet Protocol (IP) endpoint, such as a personal computer (PC), IP telephone or other communication terminal of an Internet telephony system, communicates with a "gatekeeper," which may be a communication system switch such as a private branch exchange (PBX).

More specifically, the IP endpoint generally sends Registration, Admission, Status for Signaling (RAS) messages in order to register with the gatekeeper prior to establishment of a voice path. An RAS message contains within its header the transport address, e.g., IP address and User Datagram Protocol (UDP) port number, of the IP endpoint. Its payload also includes the IP address of the IP endpoint. However, the IP address in the header of the RAS message may undergo one or more network address translation (NAT) operations within the network, e.g., in a router, virtual private network (VPN) gateway, or other network element. For example, VPN gateways configured using conventional products commercially available from vendors such as Check Point Software Technologies Ltd. of Ramat Gan, Israel and Cisco Systems Inc. of San Jose, Calif., USA, typically assign an IP address to a given IP endpoint client from a pool of addresses. This assigned IP address is a "virtual" address, and does not bind to the endpoint terminal itself.

When the gatekeeper receives the RAS message, it attempts to send an acknowledgment to the IP address contained in the payload of the RAS message. As a result of the NAT, the acknowledgment will not reach the IP endpoint, and the registration process between the endpoint and the gateway will therefore be unable to complete successfully. As a more particular example, in the context of the above-noted VPN gateway, the IP endpoint will attempt to register with the gateway using the actual endpoint IP address and not the virtual IP address assigned by the gateway, and the registration fails.

A significant problem thus exists in conventional VoIP techniques in that an H.323 endpoint generally cannot register with a gatekeeper when a NAT operation is performed within the network on an RAS message from the endpoint.

SUMMARY OF THE INVENTION

The present invention provides techniques for determining endpoint IP address assignments in an Internet telephony system, so as to overcome the above-described endpoint registration problem.

In accordance with one aspect of the invention, an endpoint virtual address determination process is implemented in an Internet telephony system in which a voice path is to be established between an endpoint and a gatekeeper such as a private branch exchange (PBX) switch or other type of enterprise communication switch. More particularly, in an illustrative embodiment, the endpoint initiates a registration process with the gatekeeper in conjunction with establishment of the voice path, and a virtual address assigned to the endpoint in a network address translation operation is determined. The virtual address is then communicated to the endpoint as part of or otherwise in conjunction with the registration process prior to establishment of the voice path such that the registration process can complete successfully despite the network address translation operation. The endpoint preferably utilizes the virtual address as at least one of a media channel address and a media control address in establishing a signaling channel between the endpoint and the gatekeeper subsequent to the registration process and in conjunction with establishment of the voice path.

In accordance with another aspect of the invention, the virtual address is communicated from the gatekeeper to the endpoint utilizing a non-standard data element incorporated into a gatekeeper confirmation message sent from the gatekeeper to the endpoint. More particularly, the gatekeeper confirmation message may comprise an H.323 Gatekeeper Confirm (GCF) message associated with an H.323 Registration, Admission, Status for Signaling (RAS) message.

In accordance with a further aspect of the invention, the virtual address is determined and communicated to the endpoint in response to an address request indicator associated with a gatekeeper request message sent from the endpoint to the gatekeeper. The address request indicator may be implemented utilizing a non-standard data element associated with the gatekeeper request message.

Advantageously, the invention overcomes problems associated with voice path registration failures resulting from network address translation in a router, virtual private network (VPN) gateway or other similar network address translation device.

DETAILED DESCRIPTION OF THE INVENTION

The invention will be illustrated below in conjunction with exemplary Internet telephony systems. Although well suited for use with, e.g., a system having a private branch exchange (PBX), or other call complex or call processing switch, the invention is not limited to use with any particular type of system or configuration of system elements. Those skilled in the art will recognize that the disclosed techniques may be used in any communication application in which it is desirable to provide improved endpoint registration in applications involving Internet protocol (IP) communications or other similar types of communications processed by a call complex or other type of system switch.

The term "call" as used herein is therefore intended to include communications such as voice-over-IP (VoIP) communications, session initiation protocol (SIP) communications, data transmissions, e-mail, facsimile, etc.

The term "switch" as used herein should be understood to include a PBX, an enterprise switch, or other type of telecommunications system switching device, as well as other types of processor-based communication control devices such as servers, computers, adjuncts, etc. A call complex is an example of one type of switch.

A "virtual address" as the term is used herein is intended to include, by way of example and not limitation, an IP address assigned as part of a network address translation operation, or other type of address that may be assigned by a network element to an endpoint in conjunction with establishment of a voice path in an Internet telephony system.

Figure 1:
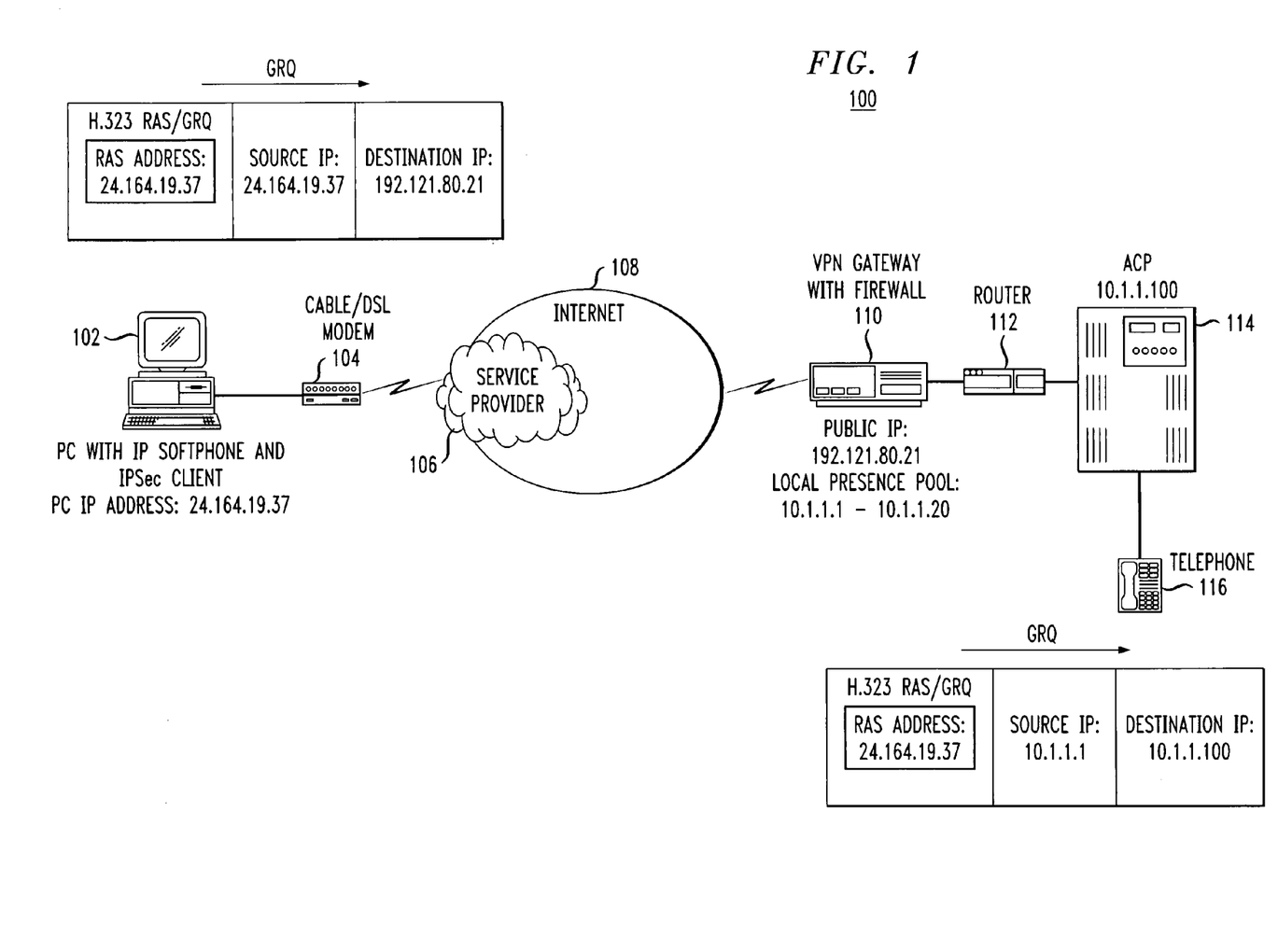
FIGS. 1 and 2 illustrate an endpoint registration process in an example Internet telephony system in which the present invention can be implemented.
Figure 2:
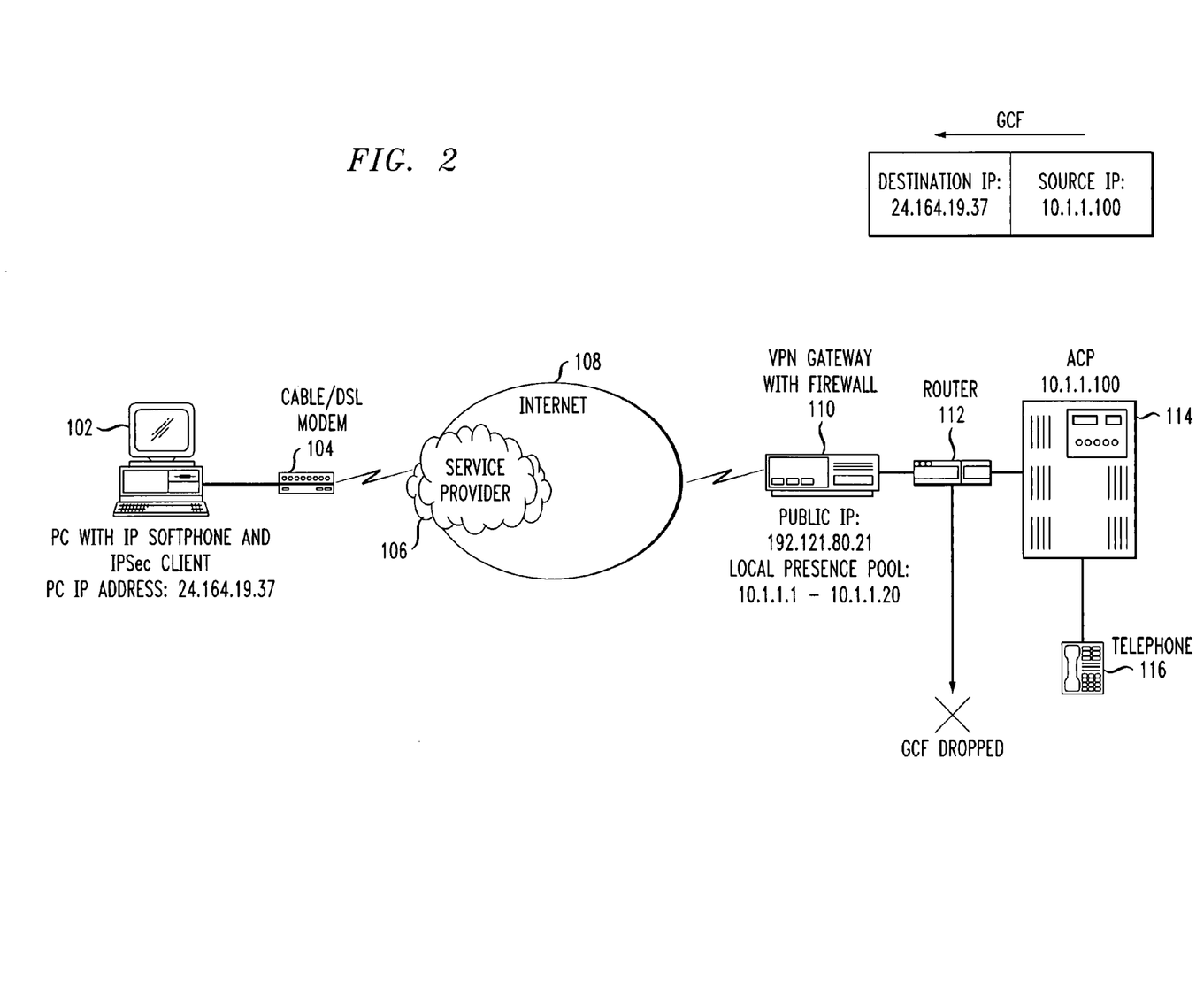

FIGS. 1 and 2 illustrate a conventional endpoint registration process in an example Internet telephony system 100 in which the present invention may be implemented.

The system 100 includes an endpoint 102 which is shown illustratively as a personal computer (PC) having IP Softphone and IP Security Protocol (IPSec) client capabilities, and an endpoint IP address. The IP Softphone is a software application that provides telephony features via a graphical user interface on a PC, and may be the Avaya IP Softphone available from Avaya Inc. of Basking Ridge, N.J., USA. The features associated with IPSec client capability are described in greater detail in corresponding IPSec standard documents, available from the Internet Engineering Task Force (IETF), which are incorporated by reference herein.

The endpoint 102 is coupled via a cable/digital subscriber loop (DSL) modem 104 to a service provider 106 associated with Internet 108, and communicates over Internet 108 with a virtual private network (VPN) gateway 110 which preferably includes a firewall, a public IP address, and a local presence pool of IP addresses. The VPN gateway 110 is coupled via a router 112 to a switch 114 which has an endpoint 116 associated therewith. The endpoint 116 is serviced by the switch 114, e.g., the switch 114 can direct incoming calls to the endpoint 116 and direct outgoing calls from the endpoint 116, in a conventional manner.

The endpoints 102 and 116, although shown illustratively as a PC and telephone, respectively, can be any type of endpoint devices, including but not limited to mobile telephones, personal digital assistants (PDAs), etc. More generally, the term "endpoint" as used herein is intended to include any device or mechanism, implemented in hardware, firmware or software or any combination thereof, configurable for providing at least an endpoint portion of a virtual address processing technique in accordance with the invention.

The switch 114 in a given embodiment of the invention may be implemented, e.g., as an otherwise conventional DEFINITY® Enterprise Communication Service (ECS) communication system switch available from Avaya Inc. of Basking Ridge, N.J., USA. Additional details regarding this type of switch may be found in, e.g., DEFINITY® ECS, Release 9, Administration for Network Connectivity, Issue 2, Document No. 555-233-504, November 2000, which is incorporated by reference herein. Other types of known switches may be configured to operate in accordance with the techniques of the invention. The conventional aspects of such switches are well known in the art and therefore not described in detail herein.

Another example switch suitable for use in conjunction with the present invention is the MultiVantage™ communication system switch, also available from Avaya Inc.

The switch 114 may also be referred to herein, by way of example, as an Avaya call processing (ACP) device.

It should be emphasized that the configuration of the switch, endpoints and other elements of the system 100 is for purposes of illustration only, and should not be construed as limiting the invention to any particular arrangement of elements. For example, the system 100 may include additional endpoints, and may utilize other types and arrangements of switching and routing elements.

The switch 114 in the system 100 is referred to as the gatekeeper, in accordance with the above-noted H.323 standard. In other embodiments of the invention, the gatekeeper may correspond to a device other than the switch. Moreover, the term "gatekeeper" as used herein is not intended to be limited to a device having the functionality described in the H.323 standard. The term "gatekeeper" as used herein is instead intended to include, by way of example and not limitation, any switch, or other device or mechanism, implemented in hardware, firmware or software or any combination thereof, configurable for providing at least a gatekeeper portion of a virtual address processing technique in accordance with the invention.

With continued reference to FIG. 1, the endpoint 102 sends a Gatekeeper Request (GRQ) message to the switch 114. The endpoint 102 embeds the actual IP address of the PC in the corresponding Registration, Admission, Status for Signaling (RAS) message. As indicated in the figure, the RAS message address is the IP address 24.164.19.37 of the endpoint 102. The source IP address in the GRQ is also the IP address 24.164.19.37 of the endpoint 102, while the destination IP address in the GRQ is the public IP address 192.121.80.21 of the VPN gateway 110.

The VPN gateway 110, in accordance with the conventional practice previously described, performs a network address translation (NAT) operation which assigns to the requesting endpoint 102 a source IP address 10.1.1.1 selected from the local presence pool which in this embodiment includes addresses 10.1.1.1 through 10.1.1.20. As indicated previously, this assigned IP source address is a virtual address, and does not bind to the endpoint terminal itself. The GRQ delivered from the VPN gateway to the switch 114 includes the virtual source IP address 10.1.1.1 and the destination IP address 10.1.1.100 of the switch 114, although the RAS message address remains that of the endpoint 102, namely, 24.164.19.37.

FIG. 2 illustrates that the switch 114, after receiving the GRQ, sends a Gatekeeper Confirm (GCF) to the address contained in the payload of the RAS message, that is, the IP address 24.164.19.37 of the endpoint 102. However, as was described in detail above, the IP address in the payload of the RAS message is unreachable from the location of the switch 114, due to the NAT operation implemented by the VPN gateway 110, and hence the registration will fail. The GCF is therefore dropped by the router 112.

FIGS. 3, 4, 5 and 6 illustrate an IP address determination process implemented in the system 100 of FIGS. 1 and 2 in accordance with the techniques of the invention. The system 100 is relabeled as system 100' for FIGS. 3, 4, 5 and 6 to indicate that one or more elements thereof are modified to operate using the techniques of the invention, rather than the conventional techniques as described in conjunction with FIGS. 1 and 2. Also, endpoint 102 and switch 114 are relabeled as endpoint 102' and switch 114' to indicate that these are modified elements in the illustrative embodiment. One or more other elements may also be modified, as will be apparent to those skilled in the art.

Figure 3:
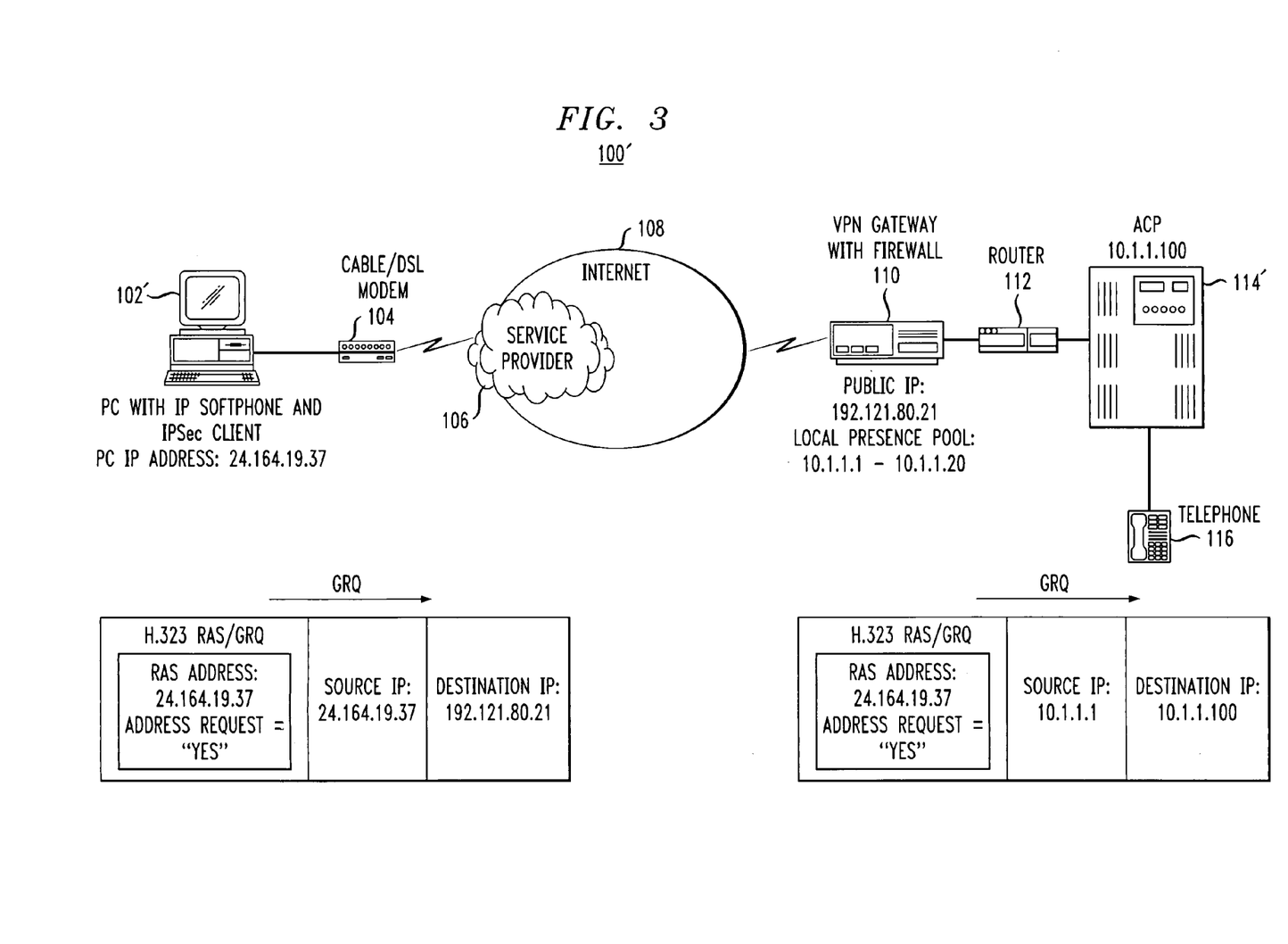
FIGS. 3, 4, 5 and 6 illustrate an IP address determination process implemented in the system of FIGS. 1 and 2 in accordance with the techniques of the invention.

Referring initially to FIG. 3, the endpoint 102' sends a GRQ with an address request indicator contained therein. This arrangement utilizes a non-standard data element that includes the address request indicator, as is shown in the figure. The RAS message address is again the IP address of the endpoint 102', that is, 24.164.19.37. The source IP address in the GRQ is also 24.164.19.37, and the destination IP address is the IP address 192.121.80.21 of the VPN gateway 110. The address request indicator in this embodiment may be "YES" or "NO," and for the example of FIG. 3 is shown as being "YES." A single bit of binary information may be used to implement the address request indicator.

The GRQ is subject to the previously-described NAT operation in the VPN gateway 110, and as a result the corresponding source IP address is changed to the virtual IP address 10.1.1.1. The destination IP address is changed to the IP address 10.1.1.100 of the switch 114'.

Upon receiving the GRQ with the address request indicator set to "YES," the switch 114' compares the IP part of the RAS address with the IP part of the source address of the GRQ. If the IP addresses are different, then the switch 114' responds with a GCF containing the IP address which was the source address in the GRQ, using a non-standard data element that can carry an IP address back to the endpoint 102'. This non-standard data element can have any structure suitable for carrying the IP address information back to the endpoint, and numerous such structures will be readily apparent to those skilled in the art.

Other non-standard data elements referred to herein can be configured in a similar manner. Such data elements are referred to herein as "non-standard" in conjunction with the illustrative embodiments in that these elements are not part of the current H.323 standard. The invention in other embodiments can be implemented using one or more data elements of this type which are part of a standard.

Figure 4:
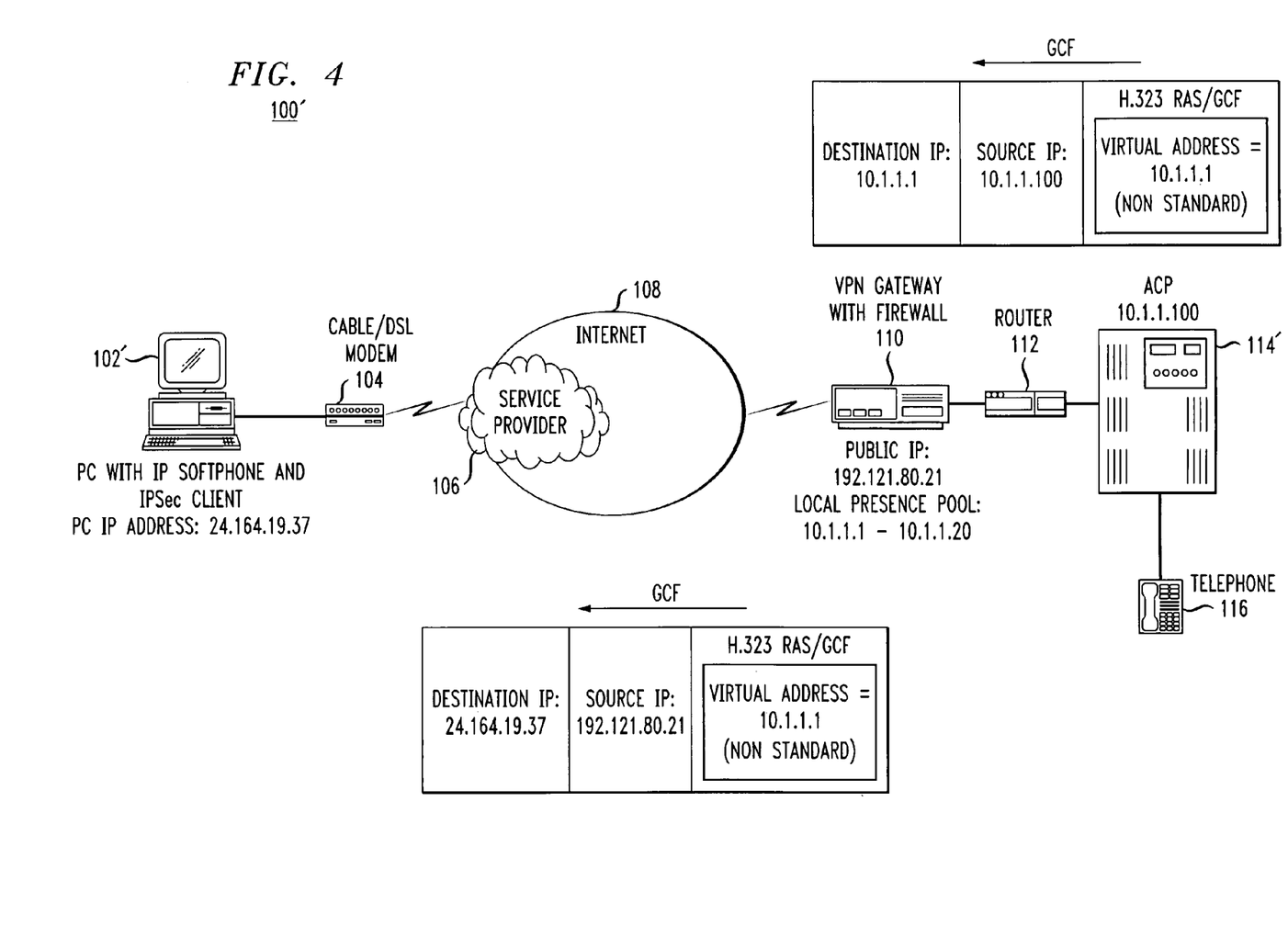

The GCF response from switch 114' is sent to the IP address, i.e., the virtual IP address, which was the source address in the GRQ, as is illustrated in FIG. 4. The destination IP address of the GCF is therefore the virtual IP address 10.1.1.1 previously assigned by the VPN gateway 110 to the requesting endpoint 102'. The source IP address for the GCF is the IP address of the switch 114', that is, 10.1.1.100. The GCF is then subject to a NAT operation in the VPN gateway 110, such that its source IP address is changed to the public IP address 192.121.80.21 of the VPN gateway 110, and its destination IP address is changed to the IP address 24.164.19.37 of the endpoint 102'. However, the above-noted non-standard data element associated with the GCF carries the virtual address 10.1.1.1 assigned by the VPN gateway 110.

Figure 5:
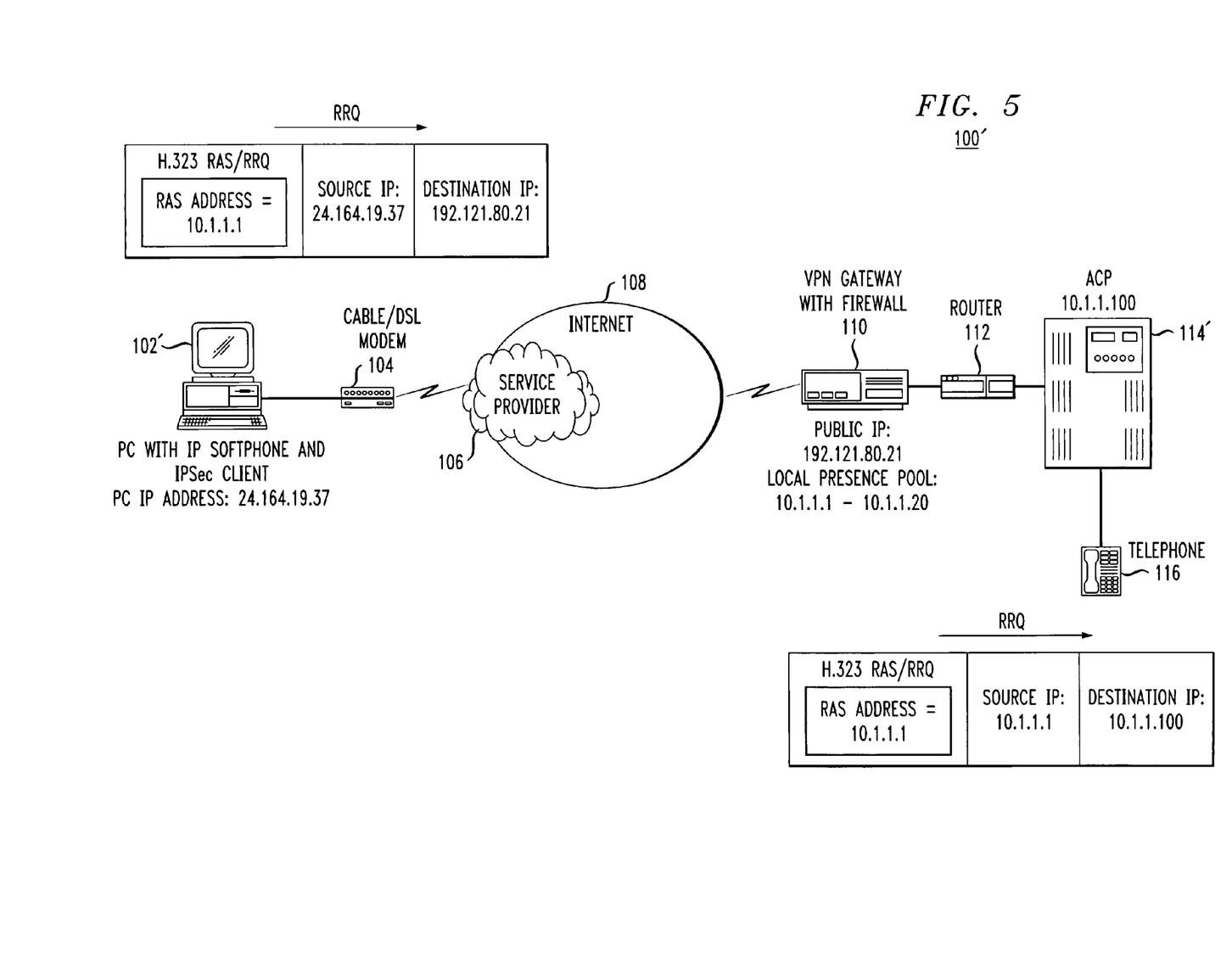

After receiving this GCF, the endpoint 102' sends a Registration Request (RRQ) message but in conjunction with an RAS message containing the virtual IP address received in the GCF, as shown in FIG. 5. In this case, the virtual IP address is the address 10.1.1.1 assigned by the VPN gateway 110 from its associated local presence pool in the manner previously described. The source IP address of the RRQ is the IP address 24.164.19.37 of the endpoint 102', and the destination address of the RRQ is the public IP address 192.121.80.21 of the VPN gateway 110. The RRQ is subject to a NAT operation in the VPN gateway 110, such that its source IP address is changed to the selected virtual IP address 10.1.1.1 and its destination IP address is changed to the IP address 10.1.1.100 of the switch 114'. The non-standard data element referred to above carries the RAS address of 10.1.1.1 in conjunction with the RRQ.

Figure 6:
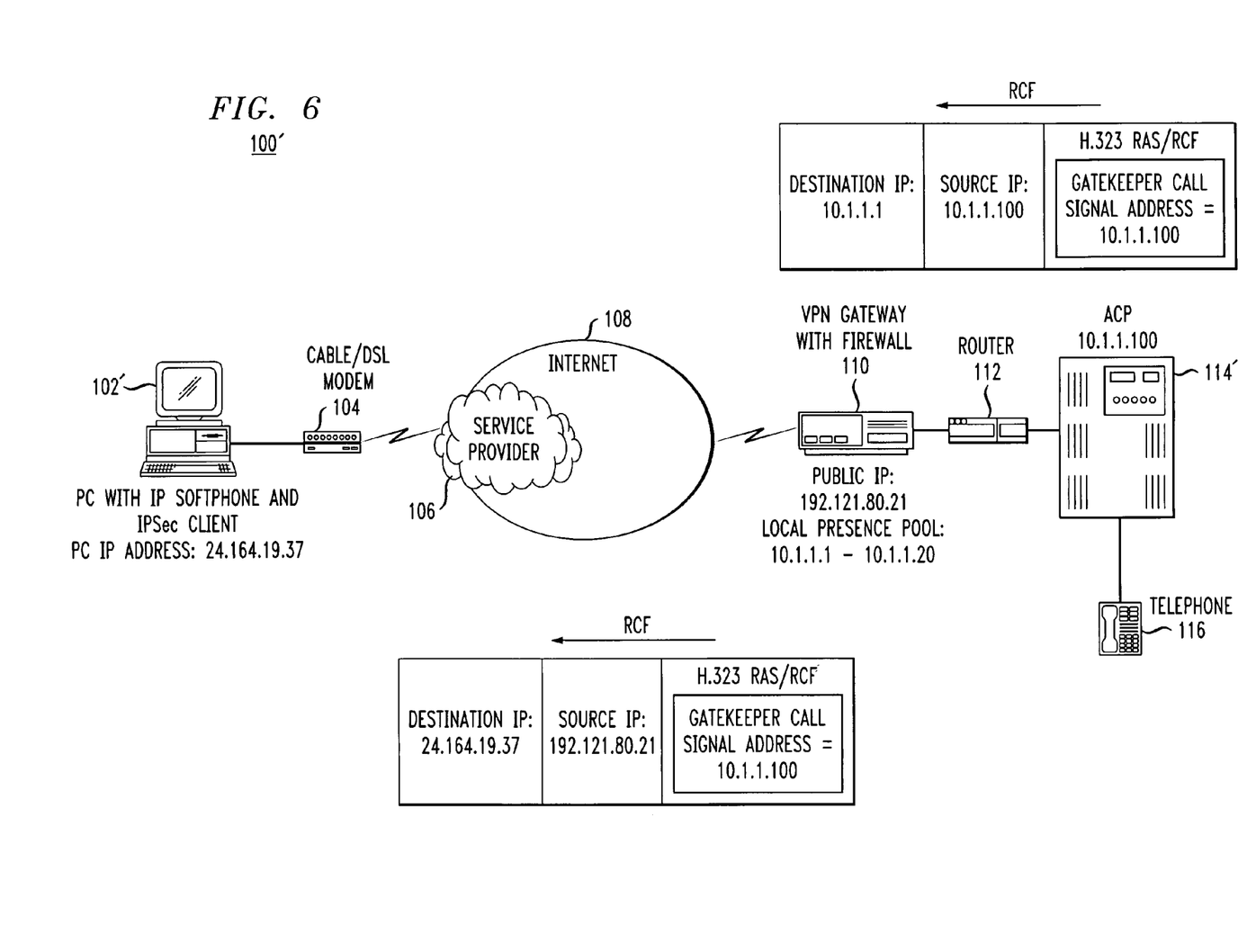

Referring now to FIG. 6, the switch 114' responds to the RRQ message by generating a Registration Confirm (RCF) message having as a destination IP address the assigned virtual IP address 10.1.1.1. The source IP address is the switch IP address 10.1.1.100. The RCF is also configured using a non-standard data element to indicate a gatekeeper call signal address as 10.1.1.100 as shown. After the NAT operation in the VPN gateway 110, the destination IP address in the RCF is changed to the IP address 24.164.19.37 of the endpoint 102' and the source IP address in the RCF is changed to the public IP address 192.121.80.21 of the VPN gateway 110. The nonstandard data element carries the gatekeeper call signal address of 10.1.1.100.

One or more software programs associated with the endpoints 102' and 116' can be modified in a straightforward manner to incorporate the above-described address request functionality and non-standard data element structures in conjunction with otherwise conventional H.323 message generation. It should be appreciated that the invention, although illustrated using H.323 messaging, is not limited to use in the H.323 context. The described techniques can be readily applied in other IP telephony systems, as will be apparent to those skilled in the art.

As a result of the above-described process, the registration will be successful, despite the NAT operations implemented by the VPN gateway 110.

After successful completion of the registration, the endpoint 102' will send its virtual IP address as its media channel address as well as media control address in a call setup message to the switch 114' during a signaling channel phase of the voice path establishment process.

It should be noted that the embodiment of the invention as illustrated in FIGS. 3, 4, 5 and 6 involves an example in which a so-called VPN tunnel is used. However, it is to be appreciated that this is not a requirement of the invention. Similar techniques can be used for system configurations involving other types of NAT operations, including NAT operations which do not utilize a VPN tunnel. For example, the described techniques can be used to solve problems arising from many-to-many NAT, also known as dynamic NAT, or one-to-one NAT, also known as static NAT.

FIGS. 7, 8, 9 and 10 illustrate an IP address determination process implemented in another example Internet telephony system 200. In this system, an endpoint 202 shown illustratively as an IP telephone terminal is coupled via a router 204 to Internet 208 and via a router 212 to a switch 214 having an endpoint 216 associated therewith. Elements 202, 208, 212, 214 and 216 correspond generally to elements 102', 108, 112, 114' and 116 of the embodiment of FIGS. 3, 4, 5 and 6.

Figure 7:
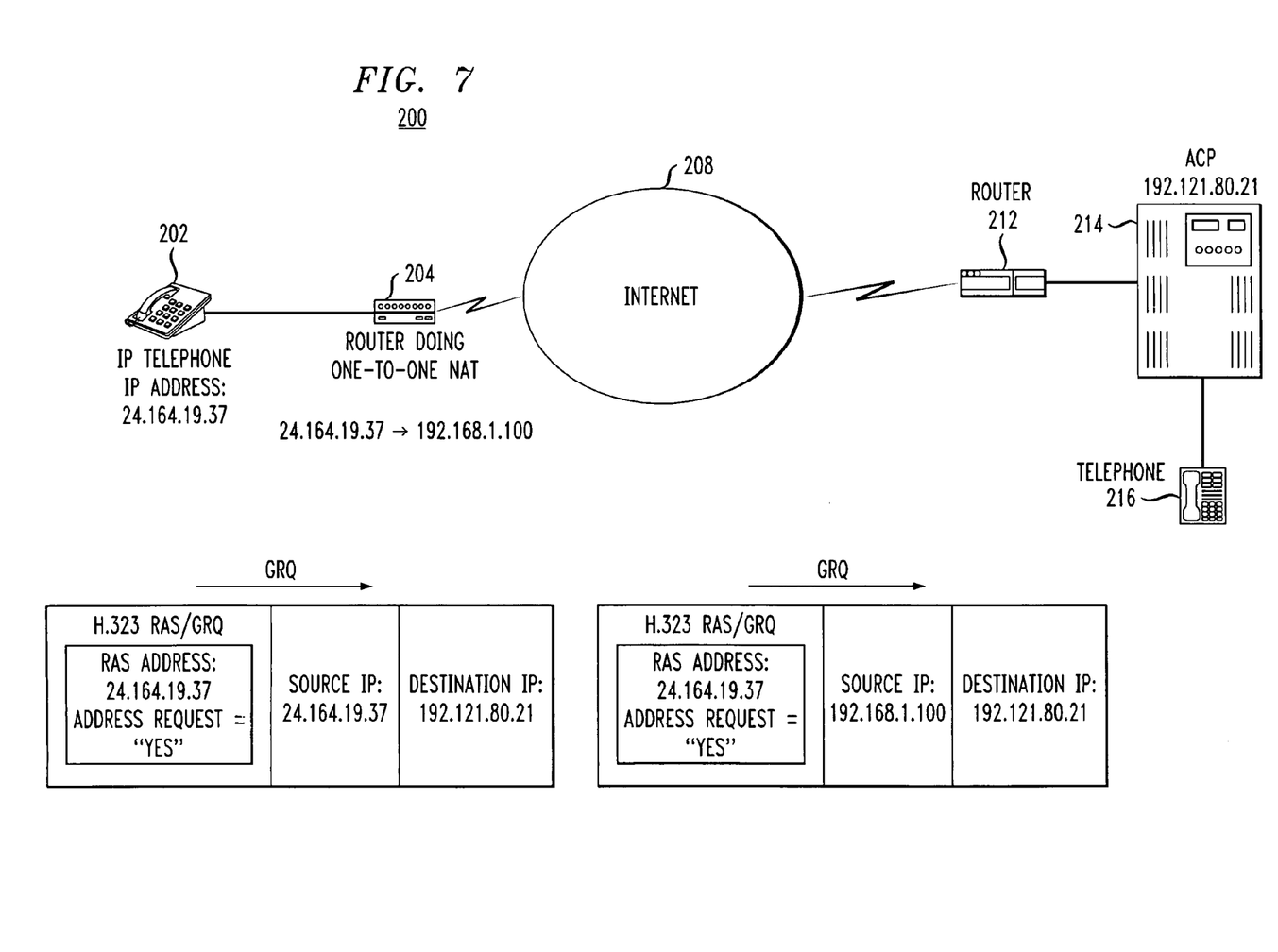
FIGS. 7, 8, 9 and 10 illustrate an IP address determination process implemented in another example Internet telephony system.

As shown in FIG. 7, endpoint 202 sends a GRQ with an address request indicator, utilizing a non-standard data element. The source IP address in the GRQ is the IP address 24.164.19.37 of the endpoint 202, and the destination IP address in the GRQ is the IP address 192.121.80.21 of the switch 214, which is also referred to herein as an ACP. The non-standard data element includes as the RAS address the IP address 24.164.19.37 of the endpoint 202, and an address request indicator set to "YES." The router 204 performs one-to-one NAT, and thus the IP address 24.164.19.37 of the endpoint 202 in the GRQ will be translated to another address, illustratively an IP address 192.168.1.100 as shown. This type of NAT would lead to a failure of the registration process if conventional techniques were used in the manner previously described. However, the present invention, through the use of the non-standard data element, preserves the RAS address of 24.164.19.37. The source IP address in the GRQ is changed to the translated IP address 192.168.1.100, while the destination IP address in the GRQ remains unchanged.

Figure 8:
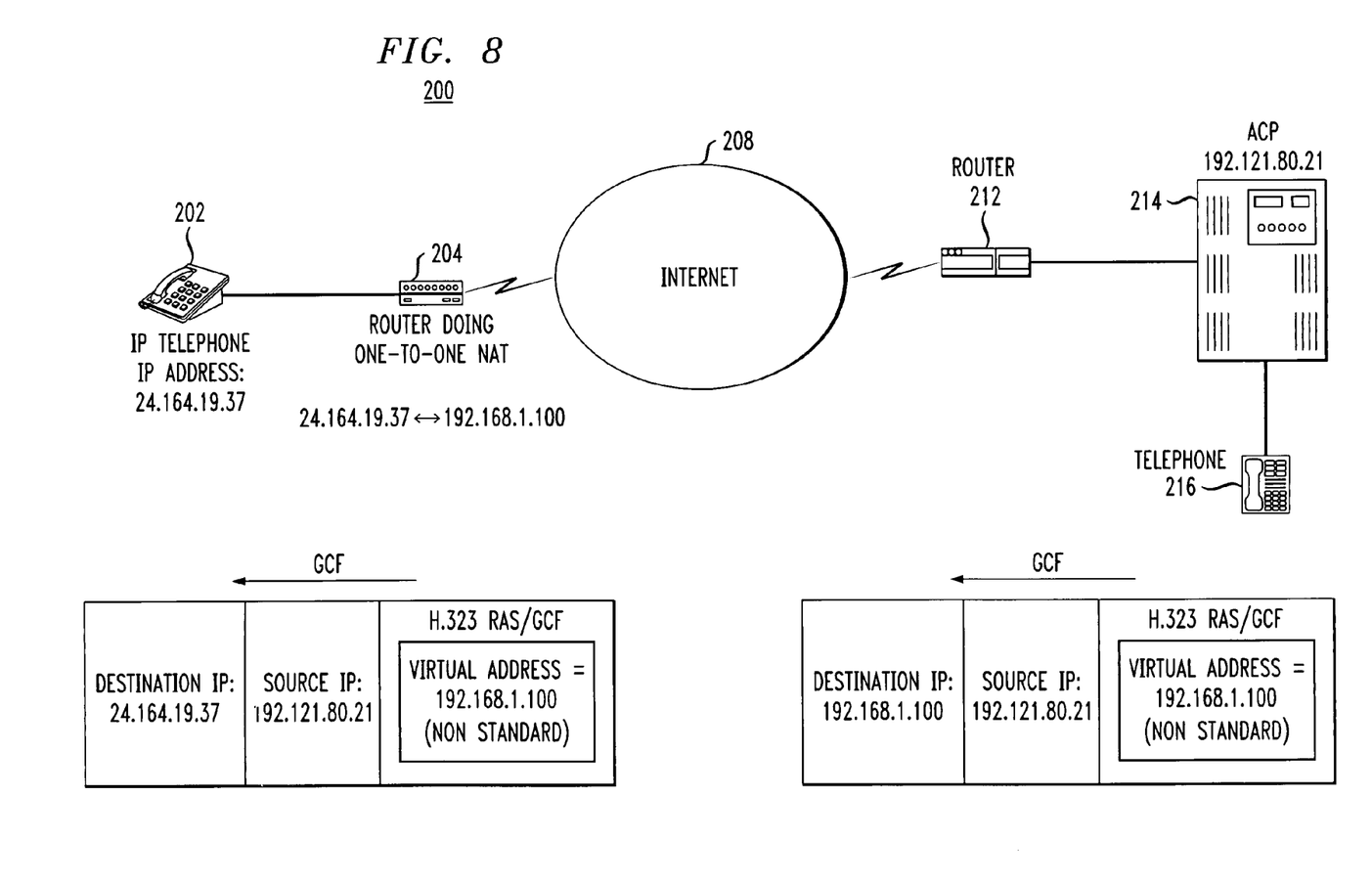

FIG. 8 illustrates that upon receiving the previously-described GRQ with the address request indicator set to "YES," the switch 214 will send a GCF to the virtual IP address 192.168.1.100 which is in the IP header of the GRQ, and not to the endpoint IP address 24.164.19.37 which is embedded in the payload of the RAS message of the GRQ. Also, the switch 214 will embed this virtual IP address 192.168.1.100, which was in the IP header of the GRQ, in the RAS message of the GCF as a non-standard data element. The source IP address of the GCF is the IP address 192.121.80.21 of the switch 214. The router 204 performs a NAT operation which translates the destination IP address in the GCF from the assigned virtual IP address 192.168.1.100 to the IP address 24.164.19.37 of the endpoint 202. The source IP address in the GCF remains unchanged. As shown in the figure, the assigned virtual address is maintained in the associated RAS using the non-standard data element.

Figure 9:
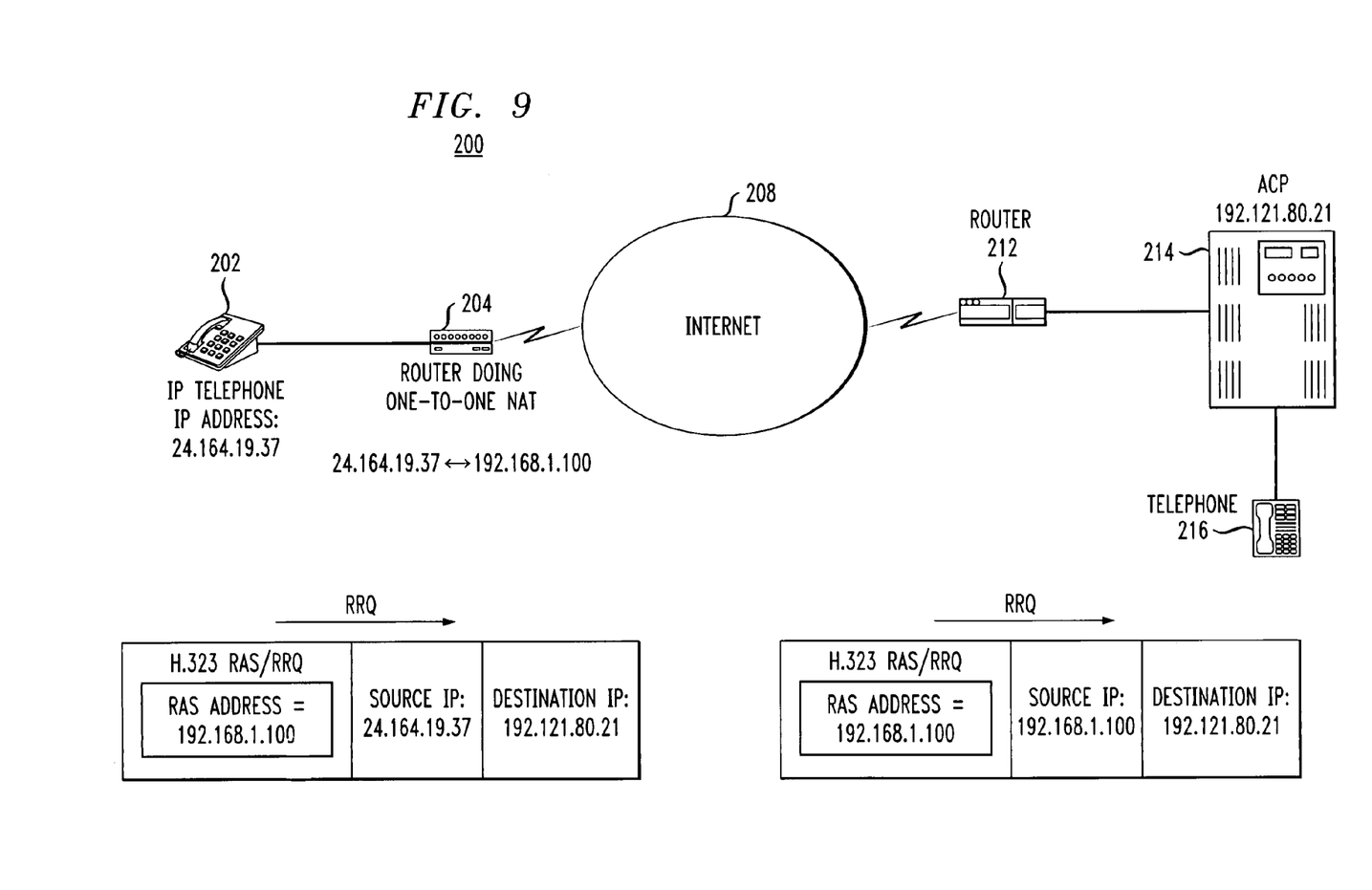

With reference now to FIG. 9, the endpoint 202 sends an RRQ to the switch 214 using the virtual IP address, which it received in the GCF, as its call signal address. The RRQ includes as its source IP address the IP address 24.164.19.37 of the endpoint 202, and as its destination IP address the IP address 192.121.80.21 of the switch 214. It also includes in a non-standard data element the virtual IP address 192.168.1.100 assigned by the router 204. As a result of the NAT operation in the router 204, the RRQ has its source IP address changed to the virtual IP address 192.121.80.21, while its destination IP address remains that of the switch 214. The non-standard data element continues to carry the virtual IP address.

Figure 10:
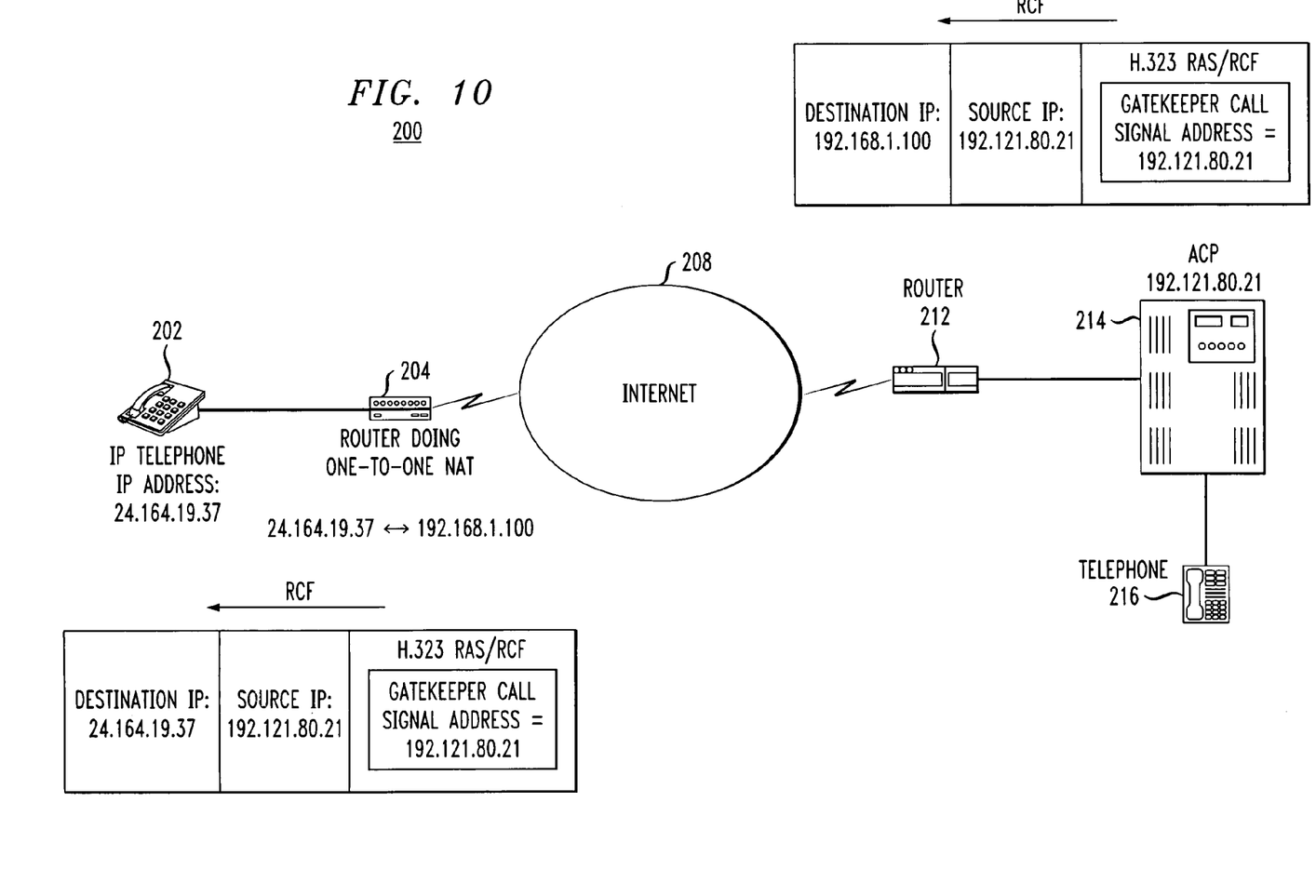

As shown in FIG. 10, upon receipt of the RRQ, an RCF is sent by the switch 214 to the virtual IP address which is the call signal address in the RRQ, as carried by the non-standard data element in the manner indicated above. The destination IP address in the RCF as sent from the switch 214 is translated from 192.168.1.100 to 24.164.19.37 in the router 204, and the registration process is successful.

The endpoint 202 will now send its virtual IP address as its media channel address and media control address in a call setup message to the switch 214 during a signaling channel phase of the voice path establishment process.

Figure 11:
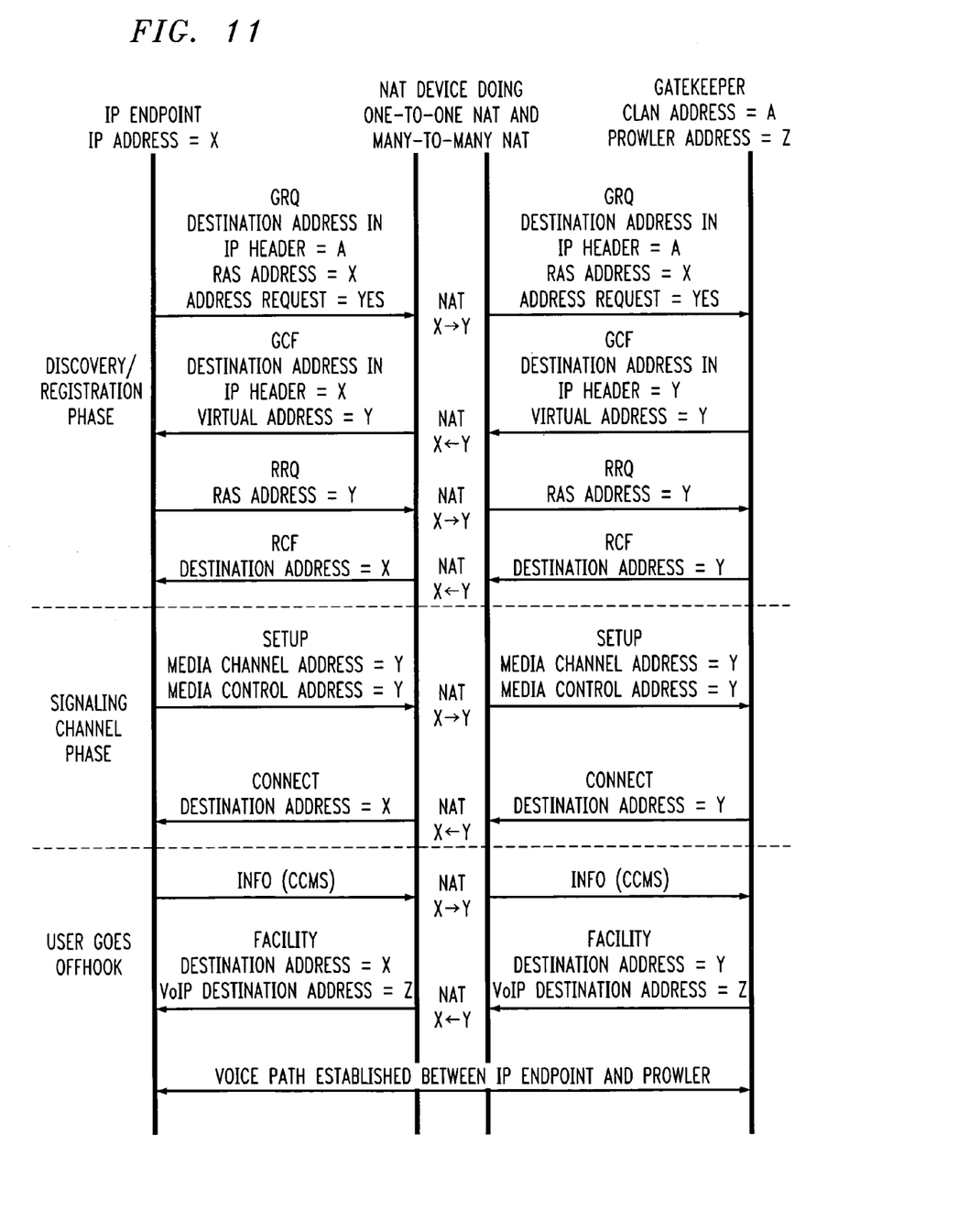
FIG. 11 is a diagram illustrating system initialization and other operations for establishing a voice path between an IP endpoint and a system switch in accordance with the techniques of the invention.

FIG. 11 illustrates system initialization and other operations used to successfully establish a voice path between an IP endpoint and a gatekeeper such as a PBX or other system switch in accordance with the invention. These operations are exemplary only, and not requirements of the invention.

In the FIG. 11 diagram, communications are shown between the following telephony system elements: (1) an IP endpoint, such as endpoint 102, 102' or 202 described above, having an IP address X; (2) a NAT device, such as VPN gateway 110 or router 204, performing one-to-one NAT and many-to-many NAT; and (3) a gatekeeper, such as switch 114, 114' or 214, having an IP address A and a so-called "Prowler" address Z, where Prowler denotes a media gateway of the gatekeeper. The former address is also referred to as a Control Local Area Network (CLAN) address. The virtual address assigned to the endpoint by the NAT device is denoted as Y in the figure.

It should be noted that the above-noted ACP element from Avaya Inc. may be configured to provide Ethernet access via two boards, namely, a CLAN board and a Prowler board. In such a configuration, the CLAN board may be used to convey signaling and control streams between the ACP and associated endpoint terminals. The Prowler board may be used as a voice bearer gateway and an audio conference bridge for transporting TDM-based traffic from an ACP backplane to one or more IP-based terminals, and to an associated wide area network (WAN).

The discovery and registration phase of the FIG. 11 diagram is similar to that described above in conjunction with FIGS. 3 through 10, and will therefore not be further described herein.

In the signaling channel phase of the diagram, a SETUP message sent from the IP endpoint to the gatekeeper indicates the media channel address and the media control address as the virtual IP address Y. A CONNECT message from the gatekeeper to the endpoint specifies a destination IP address of Y, which is translated to the destination IP address X of the endpoint in the NAT device.

The diagram also illustrates the messaging that results when the user goes offhook to initiate a voice call. An INFO (CCMS) message is first sent from the endpoint to the gatekeeper, where CCMS denotes Common Channel Message Set, a protocol used for transport of functions, such as button press, display control, lamp control, etc., to support IP terminals. CCMS messages are tunneled through Q.931 INFO messages.

The gatekeeper responds with a FACILITY message that indicates the destination IP address as Y and a VoIP address as Z. The NAT device translates the destination IP address to the IP address X of the endpoint. At this point, a voice path is established between the endpoint and the gatekeeper, or more particularly in this specific example between the endpoint and the Prowler media gateway of the gatekeeper.

It should be understood that the particular messaging arrangements shown in FIG. 11 are for purposes of illustration only, and should not be construed as limiting the scope of the invention in any way. The invention can be implemented using numerous other messaging arrangements, as will be appreciated by those skilled in the art.

Advantageously, the above-described techniques will not disturb IP endpoints that do not have the address assignment determination feature implemented since any GRQ without a nonstandard address request will be treated in a normal way.

Another advantage of the invention is that it ensures proper registration of an IP endpoint with a gatekeeper regardless of whether or not a firewall or other similar network element is compliant with H.323.

Although the invention is particularly well-suited for use in VoIP applications involving H.323, this is not a requirement of the invention, and the described techniques can be used with other standards or protocols.

Figure 12:
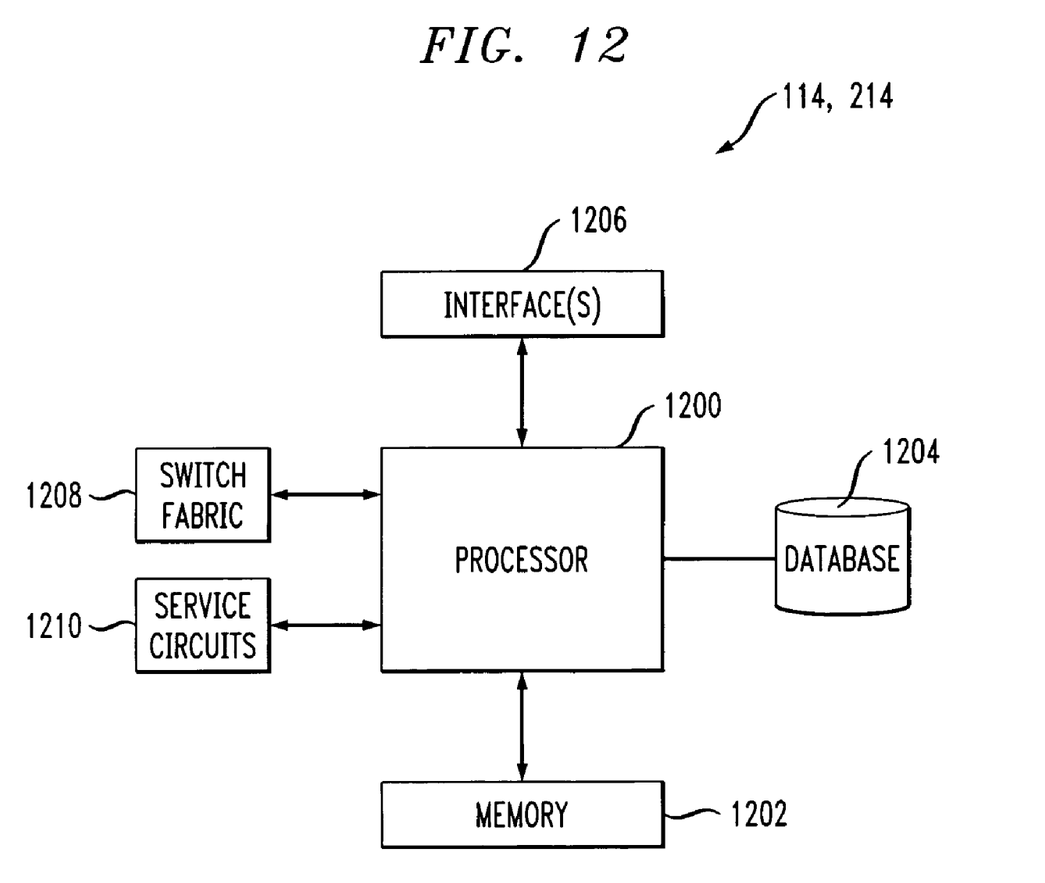
FIG. 12 shows an example implementation of a system switch suitable for use in an Internet telephony system configured in accordance with the invention.

FIG. 12 shows a more detailed view of one possible implementation of the switch 114 or 214 described above. The switch 114 or 214 in this embodiment includes a processor 1200, a memory 1202, a database 1204, one or more interfaces 1206, a switch fabric 1208, and a set of service circuits 1210. The processor 1200 may be implemented as a central processing unit (CPU), microprocessor, application-specific integrated circuit (ASIC) or other type of digital data processor, as well as various portions or combinations of such elements. The memory 1202 may be a random access memory (RAM), a read-only memory (ROM) or portions or combinations of these and other types of electronic memory devices. The memory 1202 is an example of what is generally referred to herein as a machine-readable medium.

The processor 1200 operating in conjunction with the memory 1202 executes one or more software programs for providing the above-described IP telephony functions and other functions within the switch 114 or 214. Such programs may be stored in memory 1202 or another storage device accessible to the switch and executed by processor 1200 in a conventional manner.

The database 1204 may be, e.g., an optical or magnetic disk-based storage device, or other conventional storage device associated with or otherwise accessible to the switch. The database 1204 may be used to store, e.g., feature administration information, system configuration information, etc.

The service circuits 1210 may include tone generators, announcement circuits, etc. These circuits and the interfaces 1206 are controlled by processor 1200 in implementing IP telephony functions in the switch.

The switch 114 or 214 may include additional elements which are omitted from FIG. 12 for simplicity and clarity of illustration. For example, the switch may include a port card for each type of end unit or terminal associated therewith. In addition, it will be appreciated by those skilled in the art that the switch may be configured to support multiple end units and terminals of different types, e.g., wired deskset terminals, wireless deskset terminals, personal computers, video telephones or other advanced terminals, etc. As indicated above, the switch 114 or 214 may be implemented, e.g., as an otherwise conventional DEFINITY® ECS communication system switch, or other type of known system switch configured to operate in accordance with the techniques of the invention.

The endpoints of the systems described herein may each be configured in a manner similar to that shown in FIG. 12, e.g., may include a processor, an associated memory, and one or more interfaces as described above.

Conventional aspects of the GRQ, GCF, RRQ and RCF messages referred to herein are described in the above-cited H.225 document, ITU-T Recommendation H.225, "Call signaling protocols and media stream packetization for packet-based multimedia communication systems," November 2000. Conventional aspects of the SETUP, CONNECT, INFO and FACILITY messages referred to herein are described in ITU-T Recommendation Q.931, "ISDN user-network interface layer 3 specification for basic call control," May 1998, which is incorporated by reference herein. Details regarding exchange of GRQ, GCF, RRQ, RCF, SETUP, CONNECT, INFO and FACILITY messages can be found in the above-cited H.323 document, ITU-T Recommendation H.323, "Packet-based multimedia communication systems," November 2000.

It should again be emphasized that the above-described embodiments are illustrative only. For example, alternative embodiments may utilize different switch, network, end unit and terminal configurations, different communication protocols, and different message formats. These and numerous other alternative embodiments within the scope of the following claims will be apparent to those skilled in the art.

What is claimed is:

1. A method for establishing a voice path between an endpoint and a gatekeeper in an Internet telephony system, the method comprising the steps of:

determining a virtual address assigned to the endpoint in conjunction with a network address translation operation; and communicating the virtual address to the endpoint in conjunction with a registration process prior to establishment of the voice path such that the registration process can complete successfully despite the network address translation operation;

wherein an address request indicator is sent from the endpoint to the gatekeeper, the address request indicator being configurable in at least a first state indicative of a request by the endpoint to have the virtual address returned to the endpoint and a second state indicative of absence of said request, wherein the virtual address is communicated to the endpoint in response to the address request indicator being configured in the first state.

2. The method of claim 1 further including the step of utilizing the virtual address as at least one of a media channel address and a media control address in establishing a signaling channel between the endpoint and the gatekeeper subsequent to the registration process and in conjunction with establishment of the voice path.

3. The method of claim 1 wherein the gatekeeper comprises a switch of the Internet telephony system.

4. The method of claim 3 wherein the switch comprises a private branch exchange (PBX) switch.

5. The method of claim 1 wherein the virtual address is communicated from the gatekeeper to the endpoint.

6. The method of claim 1 wherein the network address translation operation is implemented by a virtual private network (VPN) gateway coupled between the endpoint and the gatekeeper.

7. The method of claim 1 wherein the network address translation operation is implemented by a router coupled between the endpoint and the gatekeeper.

8. The method of claim 1 wherein the network address translation operation comprises one of a static network address translation and a dynamic network address translation.

9. The method of claim 1 wherein the virtual address is communicated to the endpoint utilizing a non-standard data element incorporated into a gatekeeper confirmation message sent from the gatekeeper to the endpoint.

10. The method of claim 9 wherein the gatekeeper confirmation message comprises an H.323 GCF message associated with an H.323 RAS message.

11. The method of claim 1 wherein the address request indicator is associated with a gatekeeper request message sent from the endpoint to the gatekeeper.

12. The method of claim 11 wherein the address request indicator is implemented utilizing a non-standard data element associated with the gatekeeper request message.

13. The method of claim 11 wherein the gatekeeper request message comprises an H.323 GRQ message associated with an H.323 RAS message.

14. The method of claim 1 wherein the determining and communicating steps are implemented at least in part in the gatekeeper.

15. The method of claim 14 wherein the determining and communicating steps are implemented at least in part in one or more software programs stored in a memory of the gatekeeper and executed by a processor of the gatekeeper.

16. An apparatus for use in establishing a voice path between an endpoint and a gatekeeper in an Internet telephony system, the apparatus comprising:
   a memory; and
   a processor coupled to the memory, the processor being operative to perform at least a portion of a determination of a virtual address assigned to the endpoint in conjunction with a network address translation operation; and to initiate communication of the virtual address to the endpoint in conjunction with a registration process prior to establishment of the voice path such that the registration process can complete successfully despite the network address translation operation;
   wherein an address request indicator is sent from the endpoint to the gatekeeper, the address request indicator being configurable in at least a first state indicative of a request by the endpoint to have the virtual address returned to the endpoint and a second state indicative of absence of said request, wherein the virtual address is communicated to the endpoint in response to the address request indicator being configured in the first state.

17. A machine-readable medium containing one or more software programs for use in establishing a voice path between an endpoint and a gatekeeper in an Internet telephony system, wherein the one or more software programs when executed implement the steps of:
   determining a virtual address assigned to the endpoint in conjunction with a network address translation operation; and
   communicating the virtual address to the endpoint in conjunction with a registration process prior to establishment of the voice path such that the registration process can complete successfully despite the network address translation operation;
   wherein an address request indicator is sent from the endpoint to the gatekeeper, the address request indicator being configurable in at least a first state indicative of a request by the endpoint to have the virtual address returned to the endpoint and a second state indicative of absence of said request, wherein the virtual address is communicated to the endpoint in response to the address request indicator being configured in the first state.

* * * * *